United States Patent
Maier

(10) Patent No.: US 9,002,809 B2
(45) Date of Patent: Apr. 7, 2015

(54) METHOD AND APPARATUS FOR GENERATING A DATA REPOSITORY

(71) Applicant: Siemens Aktiengesellschaft, Munich (DE)

(72) Inventor: Rupert Maier, Eggolsheim (DE)

(73) Assignee: Siemens Aktiengesellschaft, Munich (DE)

( * ) Notice: Subject to any disclaimer, the term of this patent is extended or adjusted under 35 U.S.C. 154(b) by 107 days.

(21) Appl. No.: 13/748,424

(22) Filed: Jan. 23, 2013

(65) Prior Publication Data

US 2014/0156615 A1 Jun. 5, 2014

(30) Foreign Application Priority Data

Nov. 30, 2012 (EP) .................................... 12195070

(51) Int. Cl.
*G06F 17/30* (2006.01)
*G06Q 10/10* (2012.01)

(52) U.S. Cl.
CPC .......... *G06F 17/30289* (2013.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 8,572,163 | B1 * | 10/2013 | Bromley et al. | 709/203 |
| 2007/0088686 | A1 * | 4/2007 | Hurst-Hiller et al. | 707/4 |
| 2008/0172496 | A1 * | 7/2008 | Middleton et al. | 709/246 |
| 2008/0189761 | A1 * | 8/2008 | Brodie et al. | 726/1 |
| 2010/0049679 | A1 * | 2/2010 | Phillips | 706/15 |

* cited by examiner

*Primary Examiner* — Son T Hoang
(74) *Attorney, Agent, or Firm* — King & Spalding L.L.P.

(57) ABSTRACT

A computer system for generating a data repository comprising engineering, service, and lifecycle rules related to domain specific objects used by engineering, service and lifecycle software tools, may include for each engineering, service, and lifecycle software tool a software plugin adapted to generate rules arising while interacting with the respective engineering, service, and lifecycle tool, and to store the generated rules in said data repository of said computer system.

18 Claims, 1 Drawing Sheet

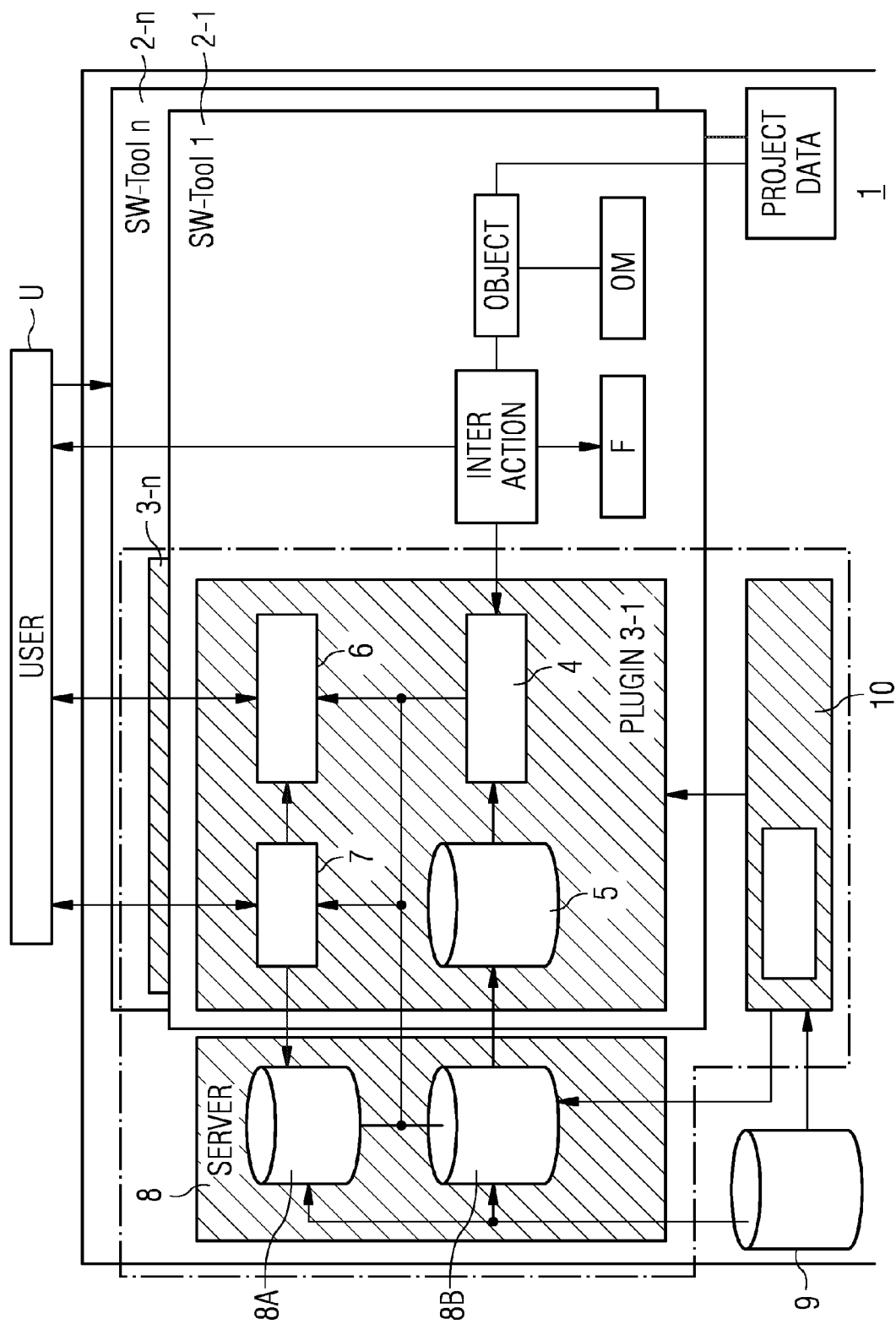

METHOD AND APPARATUS FOR GENERATING A DATA REPOSITORY

CROSS-REFERENCE TO RELATED APPLICATIONS

This application claims priority to EP Patent Application No. 12195070 filed Nov. 30, 2012. The contents of which is incorporated herein by reference in its entirety.

TECHNICAL FIELD

The disclosure relates to a method and apparatus for generating a data repository and in particular to a computer system for generating a data repository comprising engineering, service and lifecycle rules related to domain specific objects used by engineering, service and lifecycle software tools.

BACKGROUND

Many tasks performed by engineers in their respective technical field are done on the basis of computer systems. This routine work is done by the engineers using software tools running on the respective computer system. Many tasks require the input of data by the engineer via an input device such as a keyboard. On the basis of his broad technical knowledge and his experience an engineer inputs data sets with respect to the main specific objects of the respective technical domain of the engineer. This kind of interaction between the engineer and the computer system happens during the complete lifecycle of such a technical object. For instance, the object can be a plant consisting of a plurality of components. This plant, for instance a power plant or a factory, is planned by engineers in a planning phase of the lifecycle. After having planned the object such as a power plant, the object has to be activated and put into action for further operation. During operation the object has to be monitored and maintained. At the end of the lifecycle of the technical object, such as a plant, it is often necessary to rebuild or to disintegrate the object. In the different phases of the lifecycle same or different software tools are employed by the engineers to input data or commands into a computer system for fulfilling the different engineering tasks defined during the different lifecycle phases of the technical object.

In conventional systems the data input by the engineers based on their technical knowledge is only used for fulfilling the engineering tasks without consideration of the rules underlying the respective input data. With other words, the input data and commands input by the engineer into the computer system is processed and evaluated by the respective software engineering tools to fulfil the engineering tasks but it is not analyzed according to which rule the engineer has input such a kind of data into the computer system. Consequently, it is often necessary that the engineer or the team of engineers perform the input of the same or similar data or commands into the computer system according to the current situation using their internal knowledge. This kind of repetitive work is often cumbersome and time-consuming.

Accordingly, there is a need for an apparatus and a method for generating a data repository to perform routine engineering tasks automatically.

SUMMARY

One embodiment provides a computer system for generating a data repository comprising engineering, service and lifecycle rules related to domain specific objects used by engineering, service and lifecycle software tools, said computer system comprising for each engineering, service and lifecycle software tool a software plugin which is adapted to generate rules arising while interacting with the respective engineering, service and lifecycle tool and to store the generated rules in said data repository of said computer system.

In a further embodiment, the software plugin has an activation interface triggered by a user interaction of a user with said engineering, service and lifecycle software tool.

In a further embodiment, said software plugin is adapted to compare data provided by the respective engineering, service and lifecycle software tool in response to the user interaction with data already stored in said data repository and to store the data provided by the respective engineering, service and lifecycle software tool automatically if said data have not yet been stored in said data repository.

In a further embodiment, the user interaction with the engineering, service and lifecycle software tool is evaluated by said software plugin to detect a deviation of the respective user interaction from previous user interactions.

In a further embodiment, at least one user defined engineering, service or lifecycle rule is generated by said software plugin for the deviating user interaction and stored in said data repository of said computer system.

In a further embodiment, user defined rule comprises a predetermined syntax according to a predetermined standard grammar and a domain specific vocabulary stored in a data repository of said computer system.

In a further embodiment, said software plugin comprises an adapter configured to transform interaction and situation specific data provided by the user interaction into an internal data format of said data repository by means of tool specific translation data derived from functions, objects and interactions of the respective software tool.

In a further embodiment, for each user defined rule a user identification of the respective user is stored in said data repository of said computer system.

In a further embodiment, said software plugin is configured for the respective software tool by means of a configuration program on the basis of the predetermined standard grammar and domain specific vocabulary stored in the data repository of said computer system.

In a further embodiment, the computer system comprises one or more servers, comprising said data repository which stores engineering, service and lifecycle rules related to domain objects used by software tools, wherein for each software tool a software plugin is provided, said software plugin being adapted to store rules generated by a user or said software plugin in the data repository of the servers.

In a further embodiment, the server has access to a data repository which stores a predetermined standard grammar and to a data repository which stores a domain specific vocabulary.

In a further embodiment, the software plugin is adapted to visualize related, already existing rules based on the current situation and user interactions, to enable the user to identify deviations and to define new rules for said data repository.

In a further embodiment, said data repository is realized as a database or triple store.

In a further embodiment, said software plugin is derived from a global plugin via configuration.

Another embodiment provides a method for generating a data repository comprising engineering, service or lifecycle rules related to domain objects used by engineering, service and lifecycle software tools wherein for each software tool a software plugin stores engineering, service or lifecycle rules provided by the respective software tool in said data repository.

In a further embodiment, the software plugin is triggered by a user interaction of a user with the respective software tool.

In a further embodiment, the user interaction and current state of the software tool is evaluated by said software plugin to detect a deviation of the respective user interaction from previous user interactions.

In a further embodiment, at least one user defined engineering, service or lifecycle rule is generated by said software plugin for the deviating user interaction and stored in the data repository.

In a further embodiment, the user defined engineering, service and lifecycle rule comprises a predetermined syntax according to a predetermined standard grammar and domain specific vocabulary stored in a data repository.

BRIEF DESCRIPTION OF THE DRAWINGS

Example aspects of the disclosure are explained in more detail below with respect to FIG. 1, which illustrates a possible embodiment of a computer system which implements an example method for generating a data repository.

DETAILED DESCRIPTION

According to a first aspect of the disclosure a computer system for generating a data repository is provided said data repository comprising engineering, service and lifecycle rules related to domain specific objects used by engineering, service and lifecycle software tools, said computer system comprising for each engineering, service and lifecycle software tool a software plugin which is adapted to generate rules arising while interacting with the respective engineering, service and lifecycle tool and to store the generated rules in said data repository of said computer system.

In one embodiment of the computer system the software plugin has an activation interface triggered by a user interaction of users with said engineering, service and lifecycle software tool.

In a further embodiment of the computer system said software plugin is adapted to compare data provided by the respective engineering, service and lifecycle software tool in response to the user interaction with data already stored in said data repository and to store the data provided by the respective engineering, service and lifecycle software tool automatically if said data have not yet been stored in said data repository.

In a further embodiment of the computer system the user interaction with the engineering, service and lifecycle software tool is evaluated by said software plugin to detect a deviation of the respective user interaction from previous user interactions.

In a further embodiment of the computer system at least one user defined engineering, service or lifecycle rule is generated by said software plugin for the deviating user interaction and stored in said data repository of said computer system.

In a further embodiment of the computer system the user defined rule comprises a predetermined syntax according to a predetermined standard grammar and a domain specific vocabulary stored in a data repository of said computer system.

In a further embodiment of the computer system the software plugin comprises an adapter configured to transform interaction and situation specific data provided by the user interaction into an internal data format of said data repository by means of tool specific translation data derived from functions, objects and interactions of the respective software tool.

In a further embodiment of the computer system for each user defined rule a user identification of the respective user is stored in said data repository of said computer system.

In a further embodiment of the computer system the software plugin is configured for the respective software tool by means of a configuration program on the basis of the predetermined standard grammar and domain specific vocabulary stored in the data repository of said computer system.

In a further embodiment of the computer system the computer system comprises one or more servers comprising the data repository which stores engineering, service and lifecycle rules related to domain objects used by software tools, wherein for each software tool a software plugin is provided said software plugin being adapted to store rules generated by the users of said software plugin in the data repository of the servers.

In a further embodiment of the computer system the server has access to a data repository which stores a predetermined standard grammar and to a data repository which stores a domain specific vocabulary.

In a further embodiment of the computer system the software plugin is adapted to visualize related, already existing rules based on the current situation and user interactions to enable the users to identify deviations and to define new rules for said data repository.

In a further embodiment of the computer system the data repository is realized or implemented as a database or triple store.

In a further embodiment of the computer system the software plugin is derived from a global plugin via a configuration.

According to a second aspect of the disclosure a method for generating a data repository is provided, said data repository comprising engineering service or lifecycle rules related to domain objects used by engineering, service and lifecycle software tools, wherein for each software tool a software plugin stores engineering, service or lifecycle rules provided by the respective software tool in said data repository.

According to one embodiment of the method a software plugin is triggered by a user interaction of a user with the respective software tool.

In a further embodiment of the method the user interaction and current state of the software tool is evaluated by said software plugin to detect a deviation of the respective user interaction from previous user interactions.

In a further embodiment of the method at least one user defined engineering, service or lifecycle rule is generated by said software plugin for the deviating user interaction and stored in the data repository.

In a further embodiment of the method the user defined engineering, service and lifecycle rule comprises a predetermined syntax according to a predetermined standard grammar and domain specific vocabulary stored in a data repository.

As can be seen in FIG. 1, in the illustrated example computer system 1, different kinds of software tools 2-1, 2-2, . . . 2-$n$ run on the software platform of the computer system 1. Several users U can interact with the computer system 1 as shown in FIG. 1. Each user U can take different technical roles (like building, automation, commissioning, maintenance or experts) on a project during a lifecycle phase of a technical object such as a power plant. The example computer system 1 may be adapted to generate a data repository comprising engineering, service and lifecycle rules related to domain specific objects used by different engineering, service and lifecycle software tools 2-$i$ running on the computer platform. These software tools 2-$i$ can be executed by processors of the computer system 1, in particular microprocessors. The computer system 1 comprises for each engineering, service and lifecycle software tool 2-$i$ a software plugin 3-$i$ as shown in FIG. 1. The software plugin is adapted to generate rules R arising while interacting with the respective engineering, service and lifecycle tool and to store the generated rules R in the data repository of the computer system 1. As shown in FIG. 1 the user U can perform an interaction with a technical object by using a software tool 2-$i$. The interaction can be performed with respect to different functions F provided by the software tool 2-$i$. The object can be linked to an object model OM of the respective object. The object can also be linked to project data of a project performed by one or several users U using any software tool 2-$i$. The project can be for example planning a technical entity such as a power plant. An example for an engineering software tool used by users is a COMOS-software tool. At the beginning, in a front-end engineering and design phase all decisions made during this phase strongly affect the subsequent planning steps, as well as the safety, performance and cost efficiency of the entire plant. Many errors occurring in this stage or phase do affect the whole planning phase. This can result in time-consuming and expensive corrections or possibly even damages to a plant. The COMOS-software tool provides for an effective process plant engineering and comprises consistent data transfer from simulation to 3D engineering and pipe isometries. This exemplary software tool 2-$i$ offers a wide range of functionalities and is strictly object-oriented. Components or objects can be described holistically and displayed graphically in a true-to-life representation. Graphical and data-related description which includes all data associated with the respective component form a single data unit within the database, i.e. the object illustrated in FIG. 1. In a possible embodiment a complete plant information is stored in a central database. In a possible implementation all disciplines and departments are involved in an engineering and operating phase of the project and have access to the same data for any given object or component of the respective plant. Changes to objects or documents are thus available to every user U directly within a relevant engineering document.

In a possible embodiment related data sheets, lists or other documents can be linked to the corresponding objects. This allows for easy navigation between different document types. The software tool can provide an efficient data transfer between all engineering and operating phases with continuously consistent and transparent data. An object-oriented approach and the central database used by the software tools 2-$i$ can ensure an optimum networking with many individual pieces of information.

Process flow diagrams can be used for basic process engineering, for example in a COMOS-software tool. In a possible embodiment all necessary data sheets and lists, such as general plants, material information, can be generated automatically. In a possible implementation a library can be provided with modules for structures and object combinations that are frequently used in the same way.

Efficient plant engineering can only be achieved through a controlled planning process. With the example computer system 1 rules can be generated or derived by the software plugin, in particular software engineering rules. Created rules can be applied for instance for error-free creation of process flow diagrams.

As shown in FIG. 1 a software plugin comprises an activation interface which is triggered by the user interaction of the user U with the respective engineering, service and lifecycle software tool 2-$i$.

As illustrated in FIG. 1 the software plugin 3-$i$ can comprise in a possible implementation an adapter 4 configured to transform interaction and situation specific data provided by the user interaction into an internal data format of said data repository. In a possible implementation transformation can be performed by means of tool specific translation data derived from functions, objects and interactions of the respective software tool 2-$i$. The tool specific translation data can be stored in a possible implementation as shown in FIG. 1 in a local database 5 used by the software plugin 3-$i$. Tool specific translation data can be stored in an individual description file. This description file takes into account the functions, objects and interactions of the respective software tool 2-$i$. Based on a plugin template it is possible to create for each software tool 2-$i$ a corresponding matching software plugin 3-$i$. The plugin template can comprise a common software for the dialogs and a description data set.

As shown in FIG. 1 the software plugin 3-$i$ can in a possible implementation further comprise a query dialog 6 which can search for identical or similar knowledge content in a knowledge database of a server. Accordingly, the software plugin 3-$i$ is adapted to compare data provided by the respective engineering, service and lifecycle software tool 2-$i$ in response to the user interaction with data already stored in the data repository and to store the data provided by the respective engineering, service and lifecycle software tool 2-$i$ automatically, if the data have not yet been stored in said data repository. In a possible embodiment the user interaction of the user U with the engineering, service and lifecycle software tool 2-$i$ is evaluated by the associated software plugin 3-$i$ to detect a deviation of the respective user interaction from previous interactions of any user. At least one user defined engineering, service or lifecycle rule is generated by the software plugin 3-$i$ for the deviating user interaction and stored in the data repository of the computer system 1. Accordingly, if there are identical knowledge contents in the database the corresponding interaction is abolished in the software plugin 3-$i$ and no further storage of the existing knowledge content takes place. In contrast, if the data have not yet been stored, the storing of the data is performed automatically and it is possible that the user U is informed about the storage of the data. If similar but not identical knowledge contents exist, both contents, i.e. the new knowledge content and the similar already stored contents are presented to the user U in a standardized grammar.

If the data is similar, the user U recognizes that the data represents new until now not known and stored knowledge or rules he can instruct the computer system 1 in a recording dialog 7 of the plugin software tool 3-$i$ to store this new knowledge or rule in the data repository of the computer system 1 for further use.

In the embodiment shown in FIG. 1 the data repository is implemented in a server 8 of the computer system 1. The server 8 has in the shown implementation a first database 8A as a data repository in which the generated rules R provided by the plugin software tool 3-$i$ can be stored using the recording dialog 7 of the plugin software tool 3-$i$. With such a dialog 7 it is possible that the user U can describe what is new of the current interaction of the user U with the respective software tool 2-$i$. The user U can define a corresponding Rule R. In a possible implementation the Rule R is generated automatically on the basis of a current data input of the user U for a given situation and previous data input by the same user or any other user U in other similar situations. This rule R can also be linked to already existing data. In a possible embodiment the user defined rule R comprises a predetermined syntax according to a predetermined standard grammar. Further, the user defined rule R can comprise a domain specific vocabulary stored in a second database 8B of the server 8 as shown in FIG. 1. In this embodiment the formulation of the rule R takes place on the basis of the standardized syntax of the predetermined domain specific vocabulary and the already existing knowledge.

In a further implementation of the computer system 1, for each user defined rule R a user identification of the respective user is stored in the data repository of the computer system 1. The registration which user U has defined the rule R can take place during the recording dialog 7 of the plugin software tool 3-$i$. The user identification of the user U having defined the respective rule R for the knowledge database can later be processed in statistical evaluations.

With the software plugin 3-$i$ data of the current tool interaction are compared with already existing data stored in the knowledge database. If the data of the current interaction are new, they are automatically stored in the knowledge database. In case of doubt, the involved user or expert U in the specific technical domain is asked by use of the query dialog 6 whether the data represent new knowledge, and if yes, what kind of knowledge. In a possible embodiment in this case the corresponding expert or user U is automatically recorded along with the user defined rule R in the database. The data repository can be realized or implemented by a database or by a triple store.

In a possible embodiment the software plugin 3-$i$ is adapted to visualize related, already existing rules R based on the current situation and user interactions, to enable the user U to identify deviations and to define new rules R for the data repository. Accordingly, in a possible embodiment the software plugin 3-$i$ can provide a graphical user interface GUI for the query dialog 6 and the recording dialog 7.

In a possible implementation the server 8 has also access to a database 9 which is adapted to store a standard grammar like ISO 15926. ISO 15926 is a standard for data integration, sharing, exchange and handover between computer systems 1, specialized for the oil and gas industry. In this way it is possible to facilitate integration of data to support the lifecycle activities and processes of production facilities. A module and library is suitable for representing lifecycle information about technical installations and their components. In this way a common language for computer systems 1 is provided so that the information produced by the computer system can be integrated and used in a standardized manner such as the Web Ontology Language OWL. A data model can cover the entire lifecycle of a facility or plant and its components such as pipes, pumps or their parts. A complex technical object or facility entails many different types of activities over a long time period. For a plurality of different objects a generic and data-driven data model can be provided in this way. Each physical object can have itself many different properties. When all necessary combinations are modelled the number of combinations can get very high. Accordingly, a set of standard methods like triple_stores with SPARQL access (SPARQ=Query Language for Ontologies) can be used to manage, write and refer to applicable reference data such as physical objects, an indirect property type, a base property type or a scale.

The use of ontology standard methods allows that the information between different computer systems are exchanged in an easier way and more reliably. The data for technical objects such as a plant can be represented by a set of logical triples comprising a subject, a property and an object. In a possible embodiment as shown in FIG. 1 the software plugin 3-$i$ is configured for the respective software tool 2-$i$ by means of a configuration program 10 on the basis of a predetermined standard grammar and domain specific vocabulary stored in the data repository of the computer system 1.

The vocabulary generated according to ISO 15926 or other already existing ontologies can be used as fragments of a standardized ontology of the affected domain of the technical object and phase in the lifecycle of the respective technical object. In this way, the future development of this ontology is influenced. Data stored according to ontology standard methods can be stored centrally and based on a common grammar. In this way, the stored knowledge can be interpreted both by human experts as well as by the computer system 1. In this way, it is possible that in each software tool it can be recognized whether the currently applied knowledge is really new and has not been already generated by another software tool. Further, on the basis of this grammar the detected knowledge data can be used without much effort in future knowledge-based computer systems. Necessary information data is already stored in a data format which can be interpreted by machines or by the computer system 1.

The computer system 1 as shown in FIG. 1 comprises software tools 2-$i$ which can be for example used for engineering of a plant or complex technical facility. Each tool 2-$i$ is provided with a corresponding software plugin 3-$i$ which is activated in response to a user interaction with the corresponding software tool. The activation of the software plugin 3-$i$ is performed automatically. The computer system 1 makes use of a standard grammar such as according to ISO 15926 on the basis of which a vocabulary in terms of the respective technical domain as well as the used software tools for the respective domain can be generated. Further, it is possible to describe on the basis of this standard grammar information or knowledge data comprising rules R related to domain specific objects used by engineering, service and/or lifestyle software tools.

The configuration program or configuration software 10 shown in FIG. 1 allows to describe a vocabulary being in conformity with a target domain. In this way, a domain specific vocabulary or dictionary is created. The vocabulary can be extended by function specific parts.

In a possible embodiment the computer system 1 comprises a data interface which allows to read out the generated rules R stored in the data repository of said computer system 1 for further processing. The computer system 1 may provide an automatic standardized way to generate engineering, service and lifecycle rules R on the basis of software tools 2-$i$ used during different lifecycle phases of a complex technical system such as a power plant or facility.

A part of an exemplary ontology used by the computer system 1 can be for instance:
"Ore mine" is spezialisation of a "Mine"
"Mine" is spezialisation of a "industrial plant"
"Indusrial plant" consists out of one ore more "Technical component"
"Technical component" is described with "properties"
"explosion proof" is a "property"
"ISO 8421-1" is a "standard"
"ISO 8421-1" is valid in "USA"

Examples for Rules R generated by a software plugin are for the above ontology:

"Ore mine" allows only components with "explosion proof"
"Components" has to be listed in "internal component catalog"
"Components" has to fulfil the local "Standards"

What is claimed is:

1. A computer system for generating a data repository comprising engineering, service and lifecycle rules related to domain specific objects used by engineering, service and lifecycle software tools, the computer system comprising:
   at least one computer processor;
   a software plugin for each engineering, service, and lifecycle software tool, each software plugin being embodied in a non-transitory computer-readable medium and being configured by the at least one computer processor to:
   generate a new rule arising from an interaction of a user with a respective engineering, service and lifecycle software tool;
   compare the new rule generated from the user interaction with the respective tool with existing rules already stored in the data repository,
   in response to determining that the new rule deviates over at least one threshold from any of the existing rules already stored in the data repository, automatically store the new rule in the data repository, and
   in response to determining that the new rule deviates under the at least one threshold from at least one particular existing rule already stored in the data repository;
      present the new rule and the at least one particular existing rule to the user, and
      receive from the user an input regarding whether or not to store the new rule in the data repository.

2. The computer system according to claim 1, wherein the software plugin has an activation interface triggered by the user interaction with the respective engineering, service and lifecycle software tool.

3. The computer system according to claim 2, wherein the user interaction with the respective engineering, service and lifecycle software tool is evaluated by the software plugin to detect a deviation of the user interaction from previous user interactions.

4. The computer system according to claim 3, wherein at least the new rule is generated by the software plugin for the detected deviation and stored in the data repository of the computer system.

5. The computer system according to claim 4, wherein rules are user-defined and each rule comprises a predetermined syntax according to a predetermined standard grammar and a domain specific vocabulary stored in the data repository of the computer system.

6. The computer system according to claim 4, wherein for each user-defined rule, a user identification of a respective user is stored in the data repository of the computer system.

7. The computer system according to claim 1, wherein the software plugin comprises an adapter configured to transform interaction and situation specific data provided by the user interaction into an internal data format of the data repository by means of tool specific translation data derived from functions, objects and interactions of the respective software tool.

8. The computer system according to claim 1, wherein the software plugin is configured for the respective software tool by means of a configuration program on a basis of the predetermined standard grammar and domain specific vocabulary stored in the data repository of the computer system.

9. The computer system according to claim 1, comprising one or more servers, comprising the data repository which stores the engineering, service and lifecycle rules related to domain objects used by software tools, wherein for each software tool a software plugin is provided, the software plugin being adapted to store rules generated by a particular user of the software plugin in the data repository of the servers.

10. The computer system according to claim 9, wherein the one or more servers have access to one data repository which stores a predetermined standard grammar and to one data repository which stores a domain specific vocabulary.

11. The computer system according to claim 1, wherein the software plugin is adapted to visualize related, already existing rules based on the user interaction, to enable the user to identify deviations and to define new rules for the data repository.

12. The computer system according to claim 1, wherein the data repository is realized as a database or triple store.

13. The computer system according to claim 1, wherein the software plugin is derived from a global plugin via configuration.

14. A method for generating a data repository comprising engineering, service or lifecycle rules related to domain objects used by engineering, service and lifecycle software tools, the method comprising:
   executing a software plugin for a respective software tool to:
      generate a new rule arising from an interaction of a user with the respective software tool;
      compare the new rule generated from the user interaction with the respective tool with existing rules already stored in the data repository,
      in response to determining that the new rule deviates over at least one threshold from any of the existing rules already stored in the data repository, automatically store the new rule in the data repository, and
      in response to determining that the new rule deviates under the at least one threshold from at least one particular existing rule already stored in the data repository;
         present the new rule and the at least one particular existing rule to the user, and
         receive from the user an input regarding whether or not to store the new rule in the data repository.

15. The method according to claim 14, wherein the software plugin is triggered by the user interaction of the user with the respective software tool.

16. The method according to claim 15, wherein the user interaction and current state of the software tool are evaluated by the software plugin to detect a deviation of the user interaction from previous user interactions.

17. The method according to claim 16, wherein at least one user-defined engineering, service or lifecycle rule is generated by the software plugin for the detected deviation and stored in the data repository.

18. The method according to claim 17, wherein the user-defined engineering, service and lifecycle rule comprises a predetermined syntax according to a predetermined standard grammar and domain specific vocabulary stored in the data repository.

* * * * *